(12) United States Patent
Cai et al.

(10) Patent No.: US 8,385,320 B2
(45) Date of Patent: Feb. 26, 2013

(54) SYSTEM AND METHOD FOR UPLINK TIMING SYNCHRONIZATION

(75) Inventors: Zhijun Cai, Euless, TX (US); James Earl Womack, Bedford, TX (US); Yongkang Jia, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 459 days.

(21) Appl. No.: 12/338,299

(22) Filed: Dec. 18, 2008

(65) Prior Publication Data

US 2009/0161654 A1    Jun. 25, 2009

Related U.S. Application Data

(60) Provisional application No. 61/015,401, filed on Dec. 20, 2007.

(51) Int. Cl.
*H04J 3/06* (2006.01)
*H04L 12/26* (2006.01)
*H04B 7/19* (2006.01)

(52) U.S. Cl. ........ 370/350; 370/503; 370/336; 370/329; 370/252; 455/509

(58) Field of Classification Search .................. 370/252, 370/335–336, 350, 330, 342–343, 503, 329; 455/502

See application file for complete search history.

(56) References Cited

U.S. PATENT DOCUMENTS

| | | | |
|---|---|---|---|
| 6,477,151 B1 | 11/2002 | Oksala | |
| 6,490,268 B1 | 12/2002 | Lee et al. | |
| 6,510,174 B1 | 1/2003 | Sexton et al. | |
| 6,633,559 B1 * | 10/2003 | Asokan et al. | 370/350 |
| 6,657,988 B2 * | 12/2003 | Toskala et al. | 370/350 |
| 6,987,979 B2 * | 1/2006 | Carlsson | 455/456.6 |
| 7,286,841 B2 * | 10/2007 | Sun et al. | 455/502 |
| 7,519,011 B2 * | 4/2009 | Petrus et al. | 370/280 |
| 7,599,327 B2 * | 10/2009 | Zhuang | 370/329 |
| 7,733,765 B2 | 6/2010 | Suo et al. | |
| 7,848,448 B2 * | 12/2010 | Han et al. | 375/295 |
| 8,046,029 B2 * | 10/2011 | Teo et al. | 455/562.1 |
| 8,072,918 B2 * | 12/2011 | Muharemovic et al. | 370/319 |
| 8,201,039 B2 * | 6/2012 | Tiedemann et al. | 714/748 |
| 2003/0058833 A1 | 3/2003 | Hashem et al. | |
| 2003/0133429 A1 * | 7/2003 | Choi et al. | 370/342 |
| 2004/0042431 A1 * | 3/2004 | Ishikawa | 370/337 |
| 2006/0035643 A1 * | 2/2006 | Vook et al. | 455/450 |
| 2007/0276955 A1 | 11/2007 | Edsberg | |
| 2008/0002660 A1 * | 1/2008 | Jeong et al. | 370/350 |
| 2008/0075036 A1 * | 3/2008 | Bertrand et al. | 370/328 |
| 2008/0080472 A1 | 4/2008 | Bertrand et al. | |
| 2008/0186893 A1 | 8/2008 | Kolding et al. | |
| 2008/0247375 A1 | 10/2008 | Muharemovic et al. | |
| 2008/0279131 A1 * | 11/2008 | Malladi et al. | 370/311 |

(Continued)

OTHER PUBLICATIONS

Motorola; 3GPP TSG RAN WG1 #51; "Views on Remaining Issues on UL Sounding RS for E-UTRA"; R1-074574; Jeju, Korea; Nov. 5-9, 2007; 7 pgs.

(Continued)

*Primary Examiner* — Kwang B Yao
*Assistant Examiner* — Candal Elpenord
(74) *Attorney, Agent, or Firm* — Conley Rose, P.C.; J. Robert Brown, Jr.

(57) ABSTRACT

A system and method are disclosed for providing uplink timing synchronization in a wireless communication system. The uplink timing synchronization may be provided via a specific message sent from the user equipment to a network access device, or may be calculated based upon data received at the network access device from the user equipment.

6 Claims, 8 Drawing Sheets

U.S. PATENT DOCUMENTS

2009/0016321 A1\* 1/2009 Li et al. .................. 370/350
2009/0047913 A1 2/2009 Kuru
2010/0303042 A1\* 12/2010 Bergman et al. ............ 370/335

OTHER PUBLICATIONS

Nokia Siemens Networks, Nokia; 3GPP TSG RAN WG1 #50bis; "Open SRS Issues"; R1-074313; Shanghai, China; Oct. 8-12, 2007; 5 pgs.

Ericsson; TSG-RAN WG1 #47bis; "Timing Advance for E-UTRA Uplink"; R1-070474; Sorrento, Italy; Jan. 15-19, 2007; 1 pg.

PCT International Search Report; PCT Application No. PCT/US2008/087414; Feb. 27, 2009; 3 pgs.

PCT Written Opinion of the International Searching Authority; PCT Application No. PCT/US2008/087414; Feb. 27, 2009; 10 pgs.

European Examination Report; European Application No. 08865743.2; Dec. 13, 2010; 3 pgs.

Cai, Zhijun; U.S. Appl. No. 13/300,118, filed Nov. 18, 2011; Title: System and Method for Uplink Timing Synchronization.

International Preliminary Report on Patentability; Application No. PCT/US2008/087414; Feb. 2, 2010; 13 pages.

European Examination Report; Application No. 08865743.2; Aug. 17, 2011; 5 page.

Final Office Action dated Aug. 2, 2012; U.S. Appl. No. 13/300,118, filed Nov. 18, 2011; 23 pages.

Mexican Office Action; Application No. MX/a/2010/006989; Jul. 27, 2012; 8 pages.

Office Action dated Jan. 20, 2012; U.S. Appl. No. 13/300,118, filed Nov. 18, 2011; 17 pages.

Mexican Office Action; Application No. MX/a/2010/006989; Nov. 29, 2011; 6 pages.

Canadian Office Action; Application No. 2,710,305; May 24, 2012; 3 pages.

Notice of Allowance dated Nov. 14, 2012; U.S. Appl. No. 13/300,118, filed Nov. 18, 2011; 16 pages.

Chinese Office Action; Application No. 200880127127.2; Nov. 14, 2012; 13 pages.

\* cited by examiner

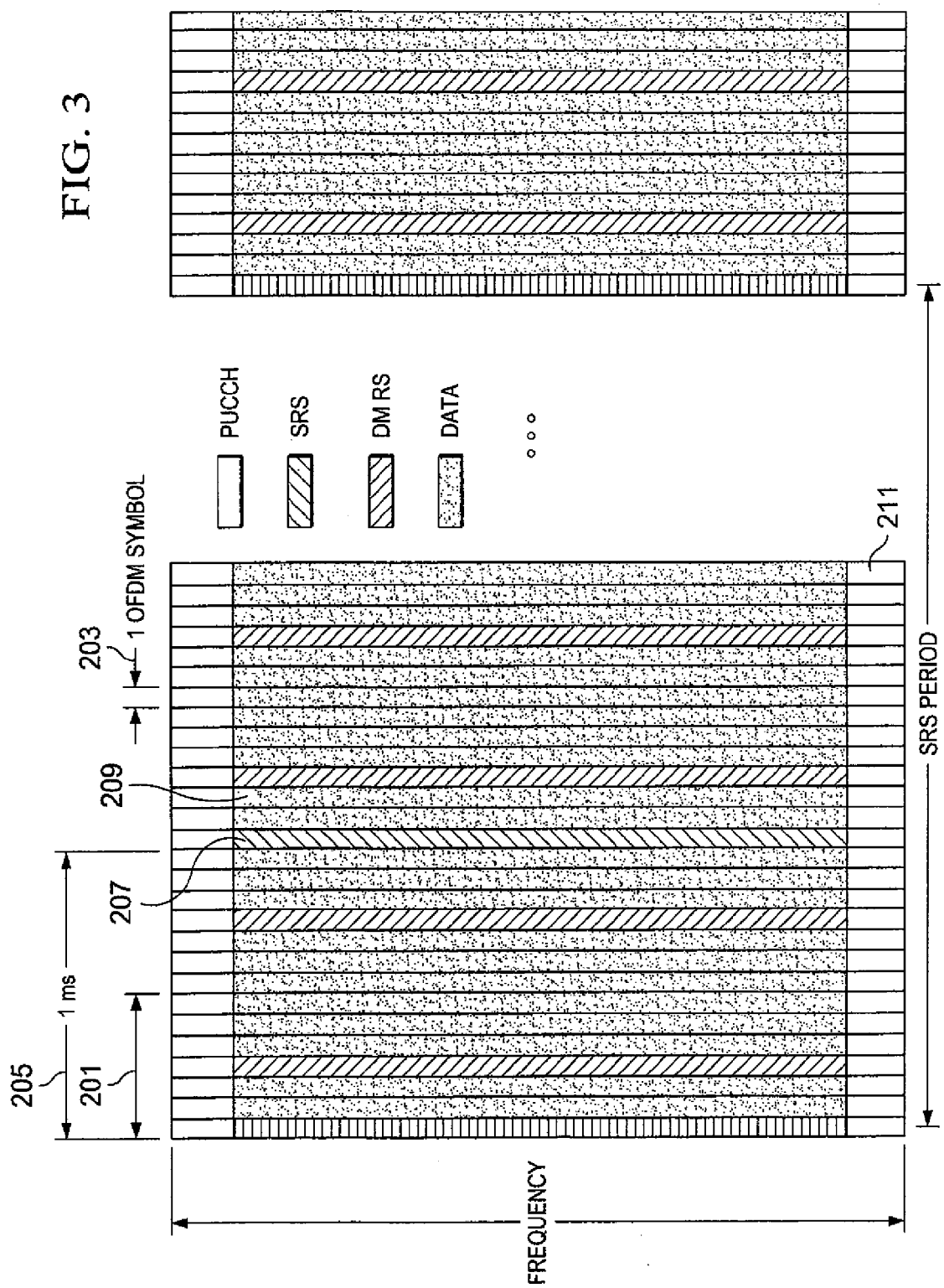

SYSTEM AND METHOD FOR UPLINK TIMING SYNCHRONIZATION

CROSS-REFERENCE TO RELATED APPLICATIONS

The present application claims priority to U.S. Provisional Patent Application No. 61/015,401, filed Dec. 20, 2007, by Zhijun S. Cai, et al, entitled "System and Method for Uplink Timing Synchronization," which is incorporated by reference herein as if reproduced in its entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. The MBMS may be communicated from an eNB to a UE using point-to-point (PTP) communication or point-to-multipoint (PTM) communication.

In wireless communication systems, transmission from the network access equipment (e.g., eNB) to the UE is referred to as a downlink transmission. Communication from the UE to the network access equipment is referred to as an uplink transmission. Wireless communication systems generally require maintenance of timing synchronization to allow for continued communications. Maintaining uplink synchronization can be problematic, wasting throughput and/or decreasing battery life of an UE given that a UE may not always have data to transmit.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is an illustration of a one possible uplink transmission channel for LTE.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
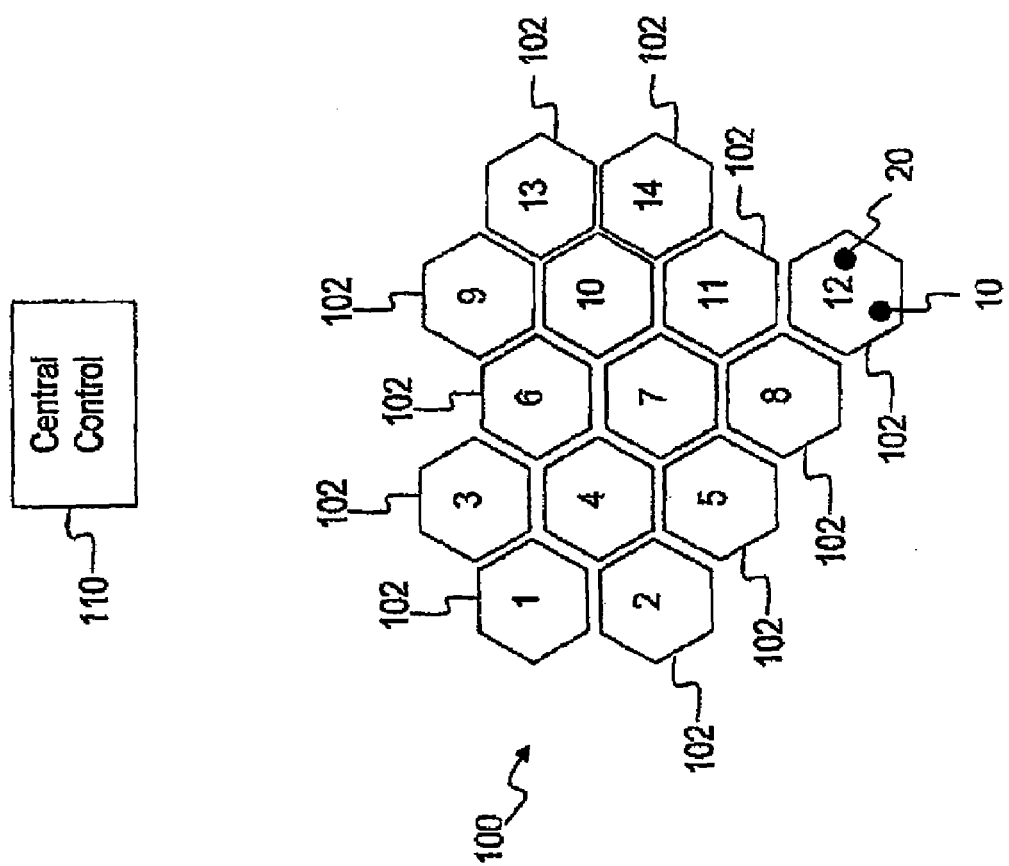
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell $102_{12}$, it should be understood that network access equipment would be present in each of the cells 102. A central control 110 may also be present in the cellular network 100 to oversee some of the wireless data transmissions within the cells 102.

Figure 2:
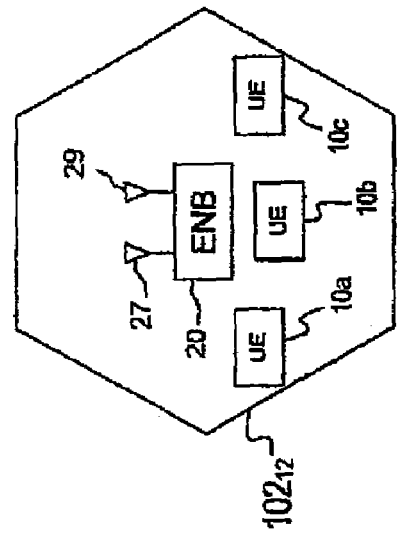
FIG. 2 is an illustration of a cell in a cellular network according to an embodiment of the disclosure.

FIG. 2 depicts a more detailed view of the cell 102₁₂. The network access equipment 20 in cell 102₁₂ may promote communication via a transmitter 27, a receiver 29, and/or other well known equipment. Similar equipment might be present in the other cells 102. A plurality of UEs 10 are present in the cell 102₁₂, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

The format of the uplink channel in LTE is shown schematically in FIG. 3. The transmission can be one of a number of different bandwidths (e.g., 1.25, 5, 15, or 20 MHz). In the time domain, the uplink is broken into frames, sub-frames and slots. A slot 201 is made up of seven orthogonal frequency division multiplexed (OFDM) symbols 203. Two slots 201 make up a sub-frame 205. A frame is a collection of 10 contiguous sub-frames. Because the exact details of a sub-frame 205 may vary depending upon the exact implementation of the LTE system, the following description is provided as an example only. The first symbol of the sub-frame 207 is where the sounding reference symbol (SRS) is placed. The UE will transmit using a constant-amplitude and zero-auto-correlation (CAZAC) sequence so that more than one UE may transmit simultaneously. The demodulation (DM) reference symbol (RS) is placed on the fourth symbol of each slot 209; and the control channel 211 is taken up by at least one resource block on the very outside edges of the frequency band.

The SRS 207 is made available at the beginning, or end, of each sub-frame 205 and is broken down into several blocks of 12 sub-carriers that correspond to the same frequency bandwidth as a resource block. A UE may use one or all of those frequency blocks depending on the transmission bandwidth selected. The UE may also use every other frequency in one or more multiple blocks. The transmission of SRSs 205 is based on the time between subsequent SRS transmission by a single UE. FIG. 3 also shows where in time and frequency that the physical uplink control channel (PUCCH) 211 is placed. Control signaling takes place in the PUCCH. In one embodiment, the system implements a hybrid automatic repeat request (HARQ) acknowledgement (ACK)/negative acknowledgement (NACK) feedback. An ACK or NACK is sent on the PUCCH 211 by the UE to the eNB to indicate whether a packet transmitted from the eNB was received at that UE. The physical uplink shared channel (PUSCH) is used to send user data.

The above description of the uplink channel is one implementation of an uplink channel proposed for LTE. It will be appreciated that other uplink channel configurations may be used wherein an uplink timing reference signal transmission (e.g., SRS) is sent during any portion of the uplink message, not necessarily only at the beginning or end of a specified time interval (e.g., slot).

Figure 4:
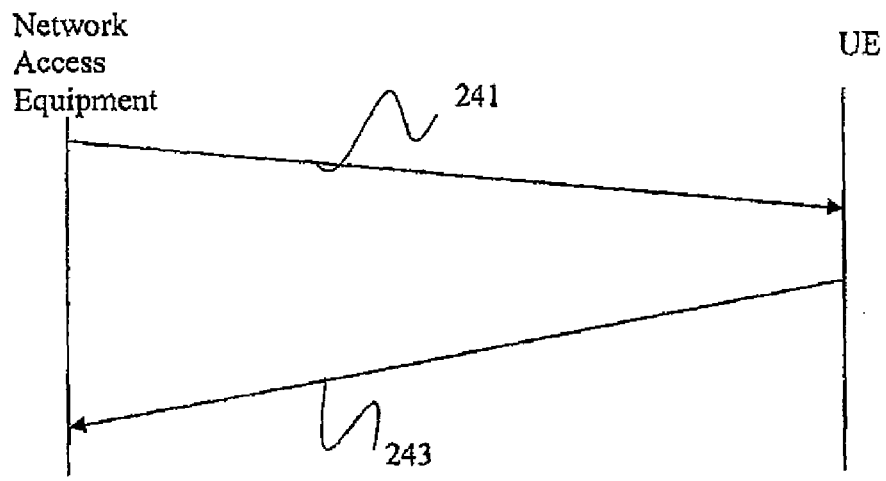
FIG. 4 is a timing diagram.

In order to maintain uplink synchronization, it is desirable for the network access equipment 20 (shown in FIG. 1) to calculate the uplink channel conditions by analyzing signals sent from the UE 10. One possible timing diagram of signals sent between the network access equipment 20 and the UE 10 is shown in FIG. 4. In this embodiment, the network access equipment 20 instructs the UE 10 when to send an uplink timing reference signal transmission (e.g., SRS), through use of an uplink timing reference signal transmission instruction message 241. The uplink timing reference signal transmission instruction message 241 may include any one of a variety of instructions. For example, the network access equipment 20 may instruct the UE 10 via the timing reference signal transmission instruction message 241 to send the timing reference signal transmissions at a constant rate, or in bursts depending on the velocity of the UE 10 relative to the network access equipment 20. In response 243, the UE 10 may send the timing reference signal transmissions (e.g., SRS) in accordance with the instructions of the network access equipment 20. However, the sending of the timing reference signal transmissions may result in a waste of network resources and a drain on the UE battery if unnecessary. Alternatively, the UE 10 may choose not to send the timing reference signal transmission if the UE 10 determines that the UE 10 will be sending data in the same time interval that the UE 10 would have sent the timing reference signal transmission. By sending data and not the timing reference signal transmission, the UE 10 avoids interference that can result when the UE transmits its CAZAC sequence.

Figure 5:
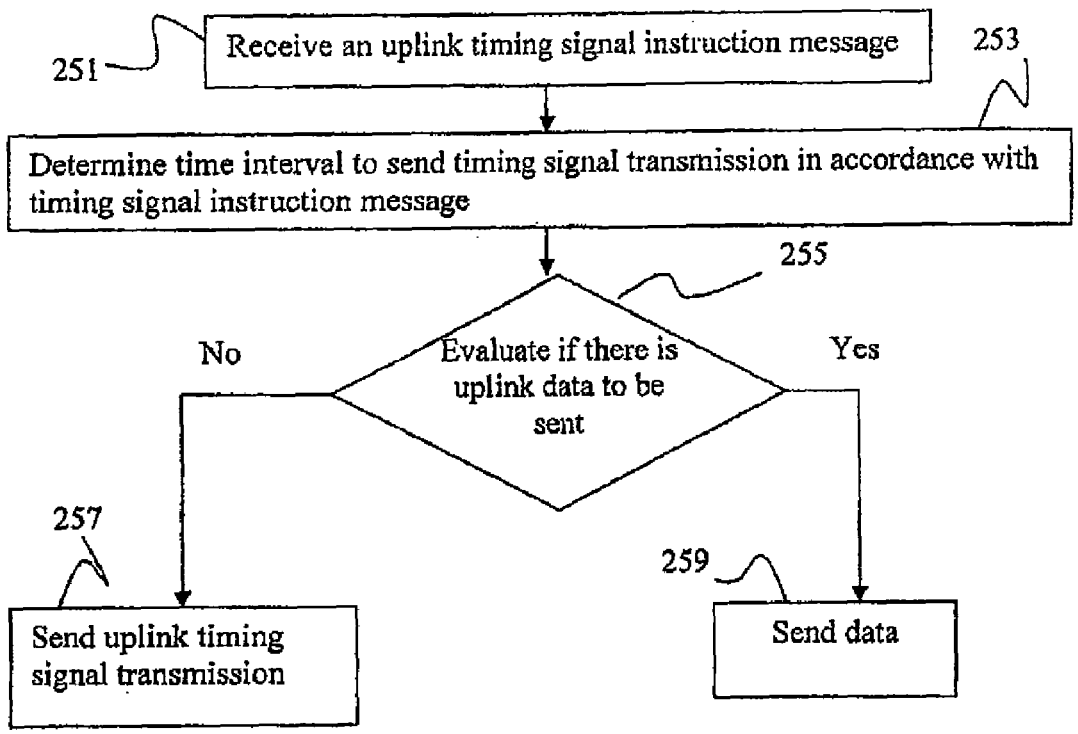
FIG. 5 is a flow chart corresponding to one UE embodiment.

FIG. 5 illustrates an embodiment of such a method for uplink timing reference signal transmission in a UE 10. At block 251, the UE receives an uplink timing reference signal instruction message. Then, at block 253, the UE determines a time interval to send a timing reference signal transmission in accordance with the timing reference signal instruction message. Next, at block 255, the UE evaluates its buffers to determine if there is uplink data to be sent. If there is no data to be sent, at block 257 the UE sends the uplink timing reference signal transmission in the time interval in accordance with the uplink timing reference signal instruction message. However, if there is data to be sent, at block 259 the UE send the data in the time interval.

Figure 6:
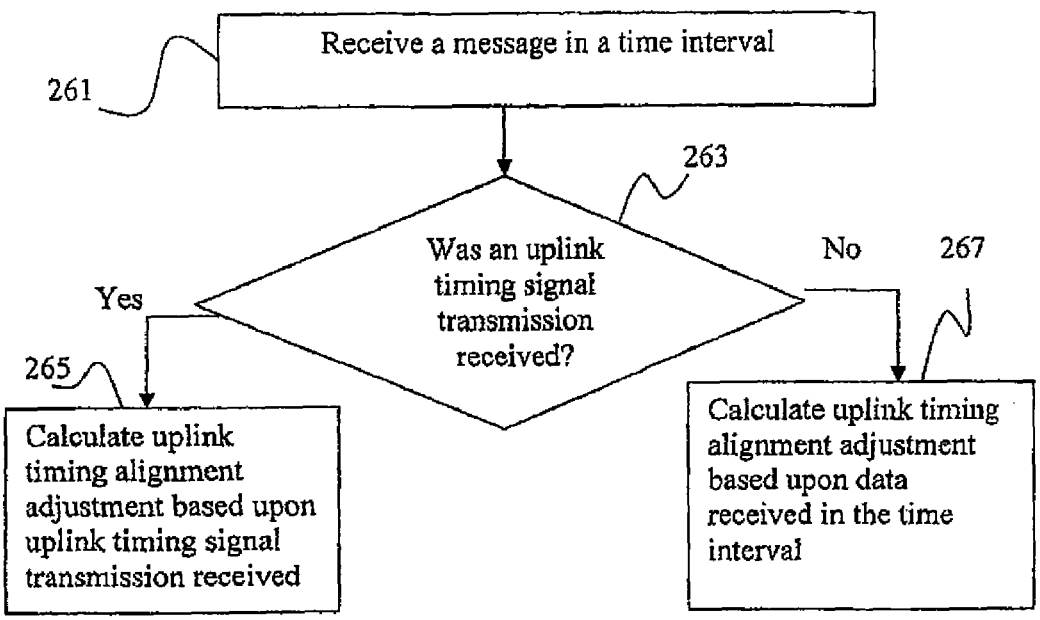
FIG. 6 is a flow chart corresponding to one network access equipment embodiment.

FIG. 6 illustrates an embodiment of a method performed by the network access equipment 20. At block 261, the network access equipment 20 first receives the message. Then, at block 263 the network access equipment 20 evaluates the time interval in which it expected to receive a timing reference signal instruction. If the network access equipment 20 determines that no timing reference signal instruction was received, then at block 267 the network access equipment will calculate an uplink timing alignment adjustment based upon the data received. For example, in an LTE system, the data comprises a DM RS. The eNB can then use the DM RS to calculate the uplink timing alignment adjustment. If however, the network access equipment determines that an uplink timing reference signal transmission was received, at block 265 the network access equipment calculates the uplink timing alignment adjustment based upon the uplink timing reference signal transmission received.

Figure 11:
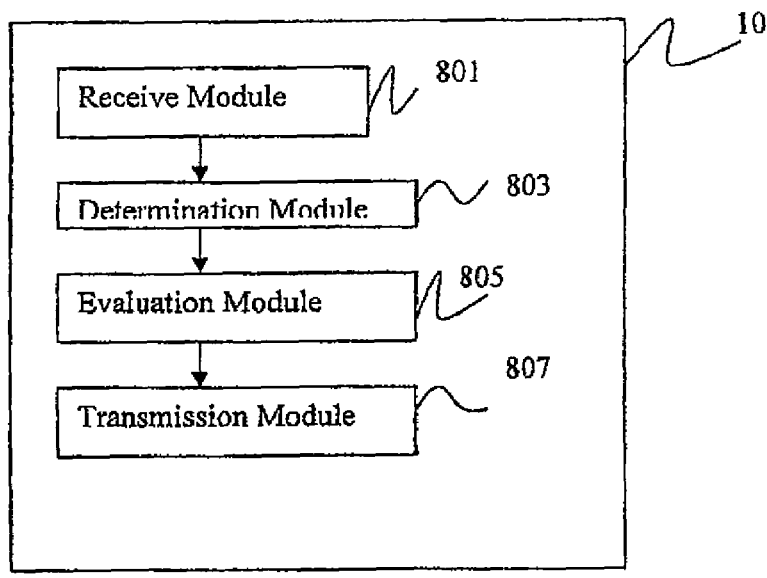
FIG. 11 is an exemplary diagram of modules in the UE.

In order to carry out the above process, the UE 10 comprises a processor capable of performing the above process. For simplicity, the different functions have been broken out into different modules. These modules may be implemented separately or together. Further, these modules may be implemented in hardware, software, or some combination. Finally, these modules may reside in different portions of the UE memory. As illustrated in FIG. 11, the UE processor comprises a receive module 801, a determination module 803, an evaluation module 805 and a transmission module 807. The receive module 801 receives the uplink timing reference transmission instruction message. The determination module 803 determines the time interval specified in the uplink timing reference transmission instruction message for transmitting the uplink timing reference transmission. The evaluation module 805 compares the time interval specified in the uplink timing reference transmission instruction message for transmitting the uplink timing reference transmission with the time interval to be used to transmit data. If the time interval for transmitting the uplink timing reference transmission is the same as the time interval for transmitting the data, the evaluation module 805 informs the transmission module 807 not to send the uplink timing reference transmission. Otherwise, the transmission module 807 sends the uplink timing reference transmission.

Figure 12:
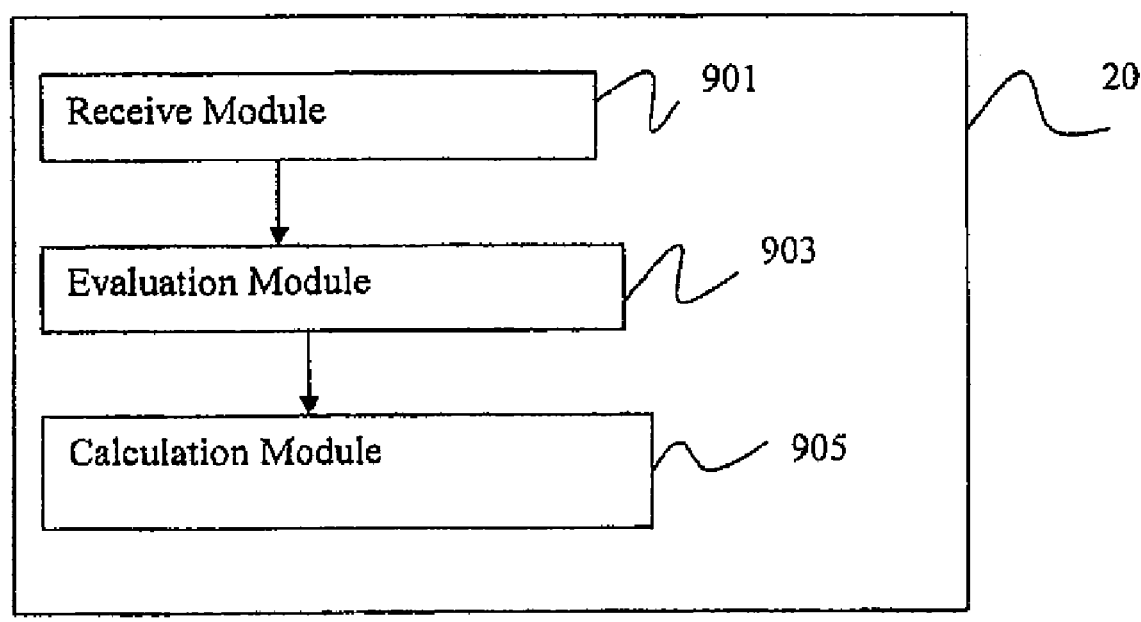
FIG. 12 is an exemplary diagram of modules in the network access equipment.

The network access equipment 20 also comprises a processor. As shown in FIG. 12, the processor comprises a receive module 901, an evaluation module 903 and a calculation module 905. Again, these modules are defined for simplicity, and may be executed in software, hardware, firmware, or both. Additionally, these modules may be stored in the same or different memories. The receiver module 901 receives the message. The evaluation module 903 evaluates the time interval in the message where it expects to receive an uplink timing reference transmission. If an uplink timing reference transmission is received, the evaluation module 903 sends the uplink timing reference transmission to the calculation module 905 to calculate an uplink timing alignment adjustment. In an LTE system, the uplink timing reference transmission is a SRS. If an uplink timing reference transmission is not received, then the evaluation module 905 sends a portion of the data in the specific time interval to the calculation module. The calculation module then calculates the uplink timing alignment adjustment based upon the portion of data received. In an LTE system the portion of data received is the DM RS.

Figure 7:
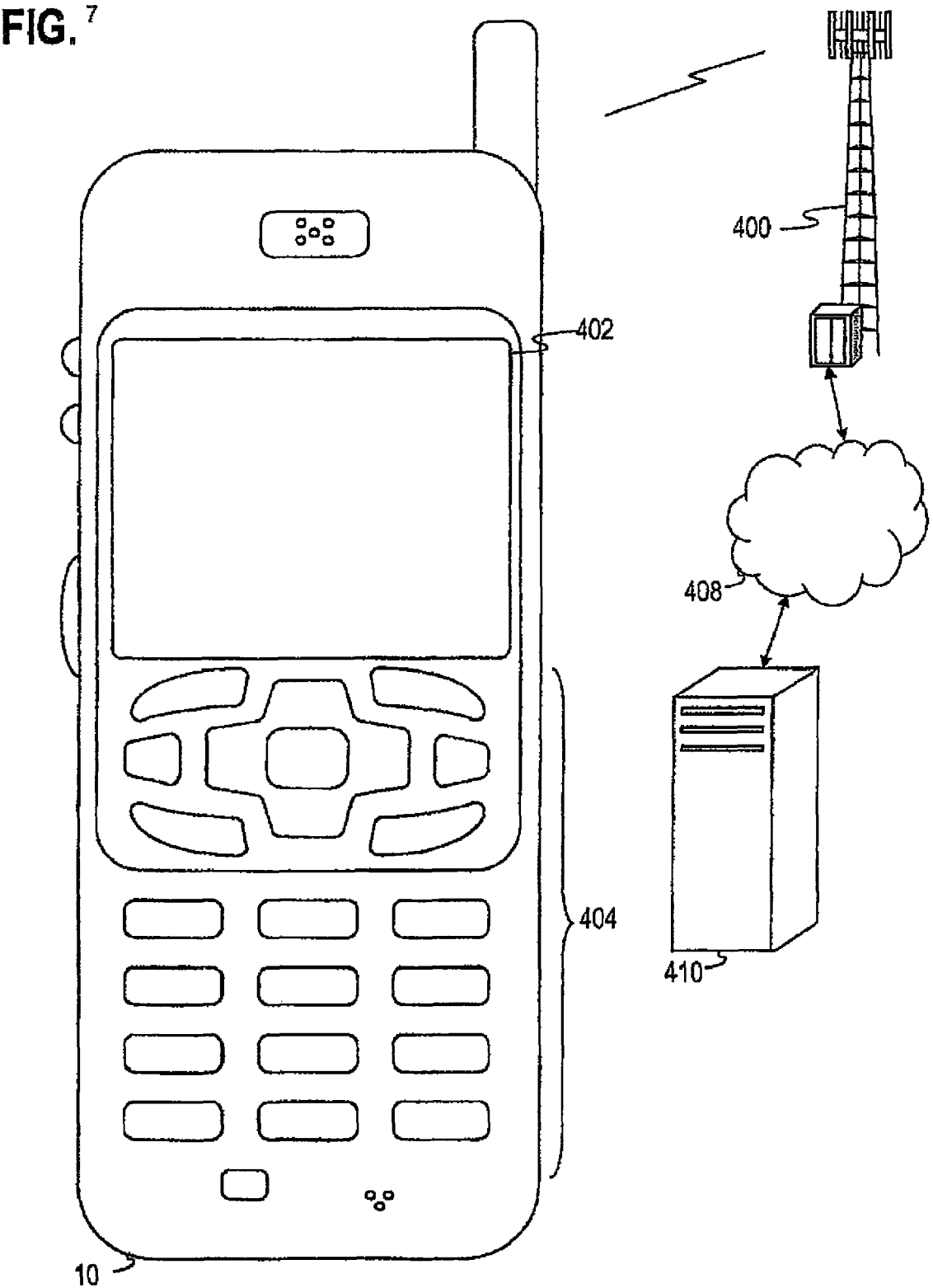
FIG. 7 is a diagram of a wireless communications system including a mobile device operable for some of the various embodiments of the disclosure.

FIG. 7 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 8:
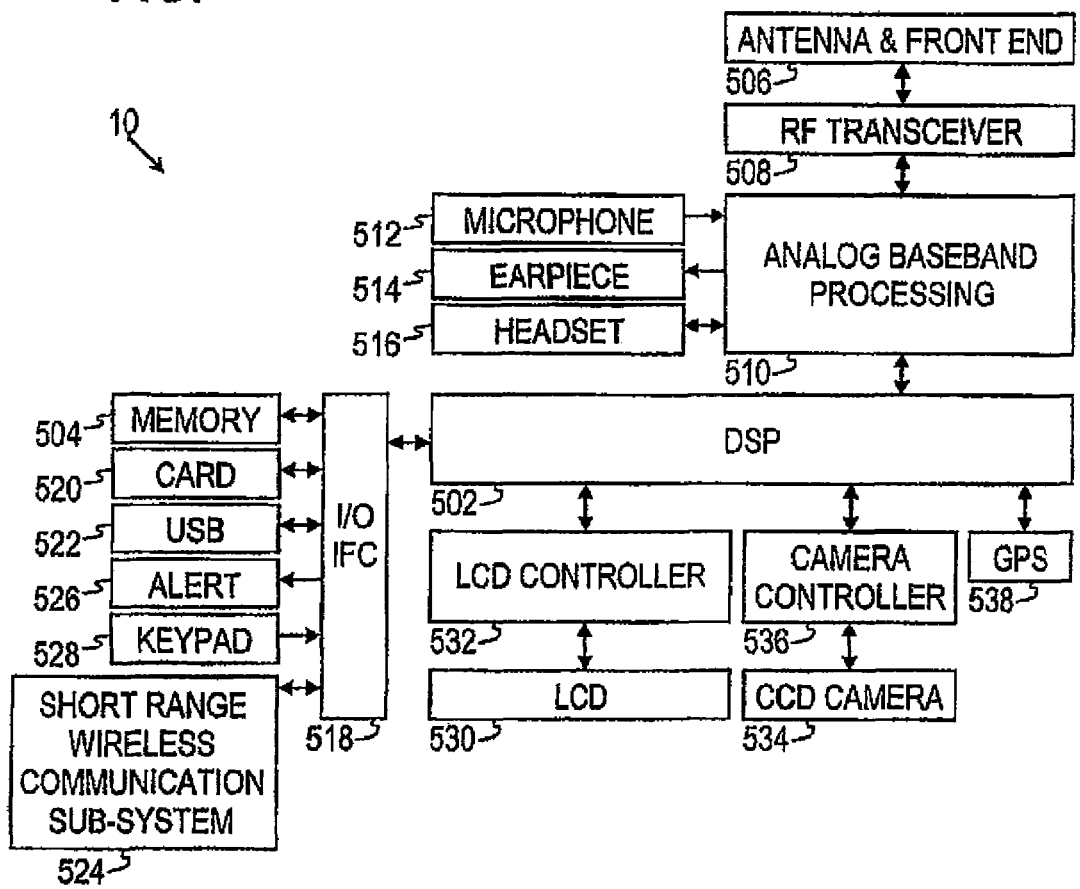
FIG. 8 is a block diagram of a mobile device operable for some of the various embodiments of the disclosure.

FIG. 8 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 9:
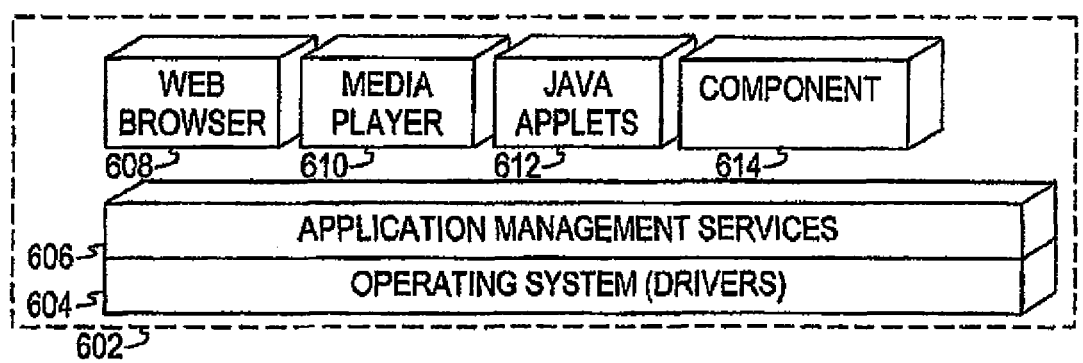
FIG. 9 is a diagram of a software environment that may be implemented on a mobile device operable for some of the various embodiments of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 0 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 10:
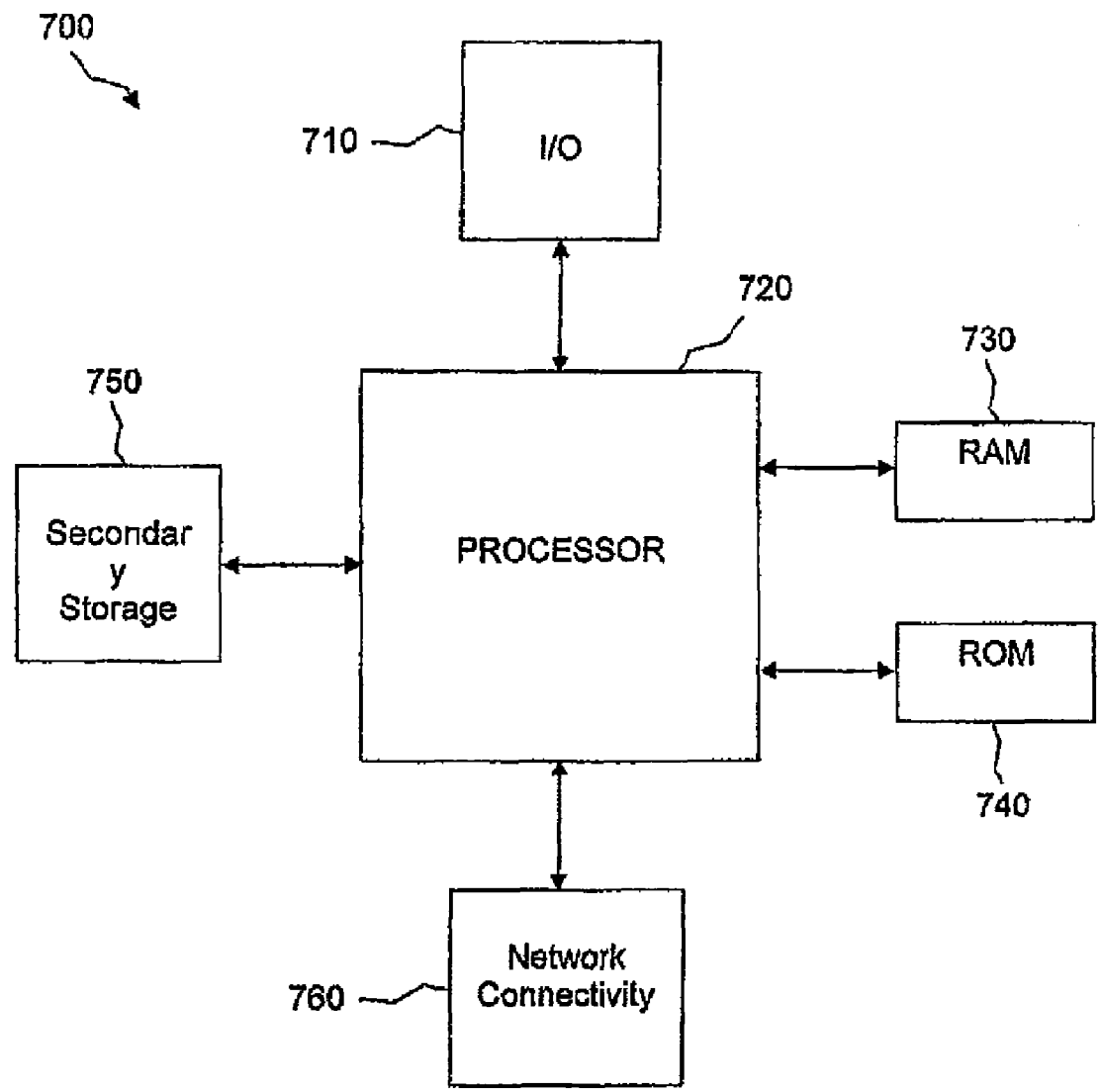
FIG. 10 is an exemplary general purpose computer according to one embodiment of the present disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 10 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of uplink timing alignment in a network access equipment comprising:
    receiving an uplink transmission comprised of at least one time interval, the time interval designated for uplink timing reference signal transmission;
    evaluating the time interval to determine if an uplink timing reference signal transmission was received; and
    responsive to evaluating, when an uplink timing reference signal transmission is received during the time interval, calculating an uplink timing alignment adjustment based on the uplink timing reference signal transmission, when an uplink timing reference signal transmission is not received during the time interval, calculating the uplink timing alignment adjustment based on data received on a physical uplink shared channel in the time interval,
    wherein the received data comprises a demodulation reference symbol.

2. The method of claim 1, wherein receiving a message further comprises receiving a sub-frame.

3. The method of claim 1, wherein the uplink timing reference signal transmission comprises a sounding reference signal.

4. A network access equipment comprising:
    one or more processors configured to promote receiving a message comprised of at least one time interval, the time interval designated for uplink timing reference signal transmission;

the one or more processors further configured to evaluate the time interval to determine if an uplink timing reference signal transmission was received;

the one more processors further configured to:
- when an uplink timing reference signal transmission is received during the time interval, calculate an uplink timing alignment adjustment based on the uplink timing reference signal transmission; and
- when an uplink timing reference signal transmission is not received during the time interval, calculating the uplink timing alignment adjustment based on data received on a physical uplink shared channel in the time interval, wherein the received data comprises a demodulation reference symbol.

5. The network access equipment of claim 4, wherein the one or more processors configured to promote receiving a message further comprises the one or more processors being configured to promote receiving a sub-frame.

6. The network access equipment of claim 4, wherein the uplink timing reference signal transmission comprises a sounding reference signal.

* * * * *